United States Patent
Safruti et al.

(10) Patent No.: US 11,924,234 B2
(45) Date of Patent: *Mar. 5, 2024

(54) ANALYZING CLIENT APPLICATION BEHAVIOR TO DETECT ANOMALIES AND PREVENT ACCESS

(71) Applicant: PERIMETERX, INC., San Francisco, CA (US)

(72) Inventors: Ido Safruti, San Francisco, CA (US); Omri Iluz, Sunnyvale, CA (US)

(73) Assignee: PERIMETERX, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,479

(22) Filed: Feb. 10, 2023

(65) Prior Publication Data
US 2023/0188555 A1 Jun. 15, 2023

Related U.S. Application Data

(63) Continuation of application No. 16/886,454, filed on May 28, 2020, now Pat. No. 11,606,374, which is a
(Continued)

(51) Int. Cl.
*H04L 29/00* (2006.01)
*G06F 21/55* (2013.01)
(Continued)

(52) U.S. Cl.
CPC ........ *H04L 63/1425* (2013.01); *G06F 21/552* (2013.01); *G06F 21/577* (2013.01); *H04L 63/0807* (2013.01); *H04L 67/02* (2013.01)

(58) Field of Classification Search
CPC . H04L 63/1425; H04L 63/0807; H04L 67/02; G06F 21/552; G06F 21/577
See application file for complete search history.

(56) References Cited

U.S. PATENT DOCUMENTS

| | | | |
|---|---|---|---|
| 6,023,682 A | 2/2000 | Checchio | |
| 6,253,325 B1 * | 6/2001 | Steele | ........................ H04L 9/40 726/5 |

(Continued)

FOREIGN PATENT DOCUMENTS

| | | |
|---|---|---|
| CN | 101128007 A | 2/2008 |
| CN | 101351027 A | 1/2009 |

(Continued)

OTHER PUBLICATIONS

Communication pursuant to Article 94(3) EPC, European Patent Office Application No. 15842077.8 dated Oct. 22, 2021, 6 pages. No copy provided, per MPEP 609. Copy submitted in parent U.S. Appl. No. 16/886,454.

(Continued)

*Primary Examiner* — Don G Zhao
(74) *Attorney, Agent, or Firm* — SQUIRE PATTON BOGGS (US) LLP

(57) ABSTRACT

A client device accesses content and performs actions at a remote application server via a user-agent application. The application server directs the user-agent application to a security verification system to retrieve and perform security tests. The security verification system receives information from the user-agent application describing characteristics of the user-agent application, and the security verification system selects a set of security tests to be performed by a security module executing in the user-agent application to verify that the user-agent application is accessing the application server consistent with the described user-agent application. The security verification system compares a set of test results with other user-agent applications and provides a token to the user-agent application to access the application server. The security module may also monitor and
(Continued)

actions on the user-agent application to permit the security verification system to revise or revoke the token.

26 Claims, 6 Drawing Sheets

Related U.S. Application Data continuation of application No. 16/241,984, filed on Jan. 7, 2019, now Pat. No. 10,708,287, which is a continuation of application No. 14/855,101, filed on Sep. 15, 2015, now Pat. No. 10,178,114.

(60) Provisional application No. 62/050,449, filed on Sep. 15, 2014.

(51) Int. Cl.
    *G06F 21/57*     (2013.01)
    *H04L 9/40*     (2022.01)
    *H04L 67/02*     (2022.01)

(56) References Cited

U.S. PATENT DOCUMENTS

| | | | |
|---|---|---|---|
| 6,260,065 B1 | 7/2001 | Leiba et al. | |
| 7,293,065 B2* | 11/2007 | Banister | H04L 51/212 709/219 |
| 7,921,462 B2* | 4/2011 | Rooney | H04L 63/1425 713/153 |
| 7,970,832 B2 | 6/2011 | Perry et al. | |
| 8,756,651 B2 | 6/2014 | Baer et al. | |
| 8,839,351 B2* | 9/2014 | Beskrovny | G06F 11/3688 726/8 |
| 9,361,446 B1* | 6/2016 | Demirjian | H04L 63/1441 |
| 9,485,255 B1* | 11/2016 | Avital | H04L 63/102 |
| 9,825,939 B2* | 11/2017 | Reilly | H04L 63/0876 |
| 10,097,583 B1* | 10/2018 | Demirjian | H04L 63/08 |
| 2002/0112156 A1* | 8/2002 | Gien | G06Q 20/00 713/156 |
| 2005/0114854 A1* | 5/2005 | Padisetty | H04L 67/10 718/1 |
| 2006/0010389 A1* | 1/2006 | Rooney | H04L 63/1458 715/736 |
| 2006/0130131 A1* | 6/2006 | Pai | H04L 63/0823 726/9 |
| 2006/0224921 A1* | 10/2006 | Marimuthu | G06F 11/3684 714/25 |
| 2007/0101405 A1* | 5/2007 | Engle | H04L 63/20 709/225 |
| 2007/0209060 A1 | 9/2007 | Rhodes | |
| 2008/0222717 A1 | 9/2008 | Rothstein et al. | |
| 2010/0281535 A1 | 11/2010 | Perry et al. | |
| 2010/0299719 A1* | 11/2010 | Burks | G06F 9/4451 709/221 |
| 2011/0179477 A1* | 7/2011 | Starnes | H04L 63/12 726/9 |
| 2011/0185231 A1* | 7/2011 | Balestrieri | G06F 11/3672 714/E11.178 |
| 2012/0005740 A1* | 1/2012 | Wurth | H04L 63/102 726/9 |
| 2012/0126856 A1* | 5/2012 | Lee | G01R 19/16528 327/74 |
| 2012/0216267 A1* | 8/2012 | Austel | H04L 67/563 726/8 |
| 2012/0304296 A1 | 11/2012 | Shulman et al. | |
| 2013/0007856 A1 | 1/2013 | Bennett et al. | |
| 2013/0024919 A1* | 1/2013 | Wetter | G06F 21/335 726/6 |
| 2013/0042152 A1* | 2/2013 | Fryc | G06F 11/3696 714/38.1 |
| 2013/0091535 A1 | 4/2013 | Beskrovny et al. | |
| 2013/0091541 A1* | 4/2013 | Beskrovny | G06F 11/3688 726/1 |
| 2013/0227662 A1* | 8/2013 | Crampton | G06F 21/6209 726/6 |
| 2014/0032759 A1 | 1/2014 | Barton et al. | |
| 2014/0047527 A1 | 2/2014 | Ngo et al. | |
| 2014/0123236 A1* | 5/2014 | Hirata | H04L 63/0807 726/4 |
| 2014/0137190 A1 | 5/2014 | Carey et al. | |
| 2014/0137246 A1 | 5/2014 | Baluda et al. | |
| 2014/0201841 A1 | 7/2014 | Deshpande et al. | |
| 2014/0223238 A1* | 8/2014 | Allen | G06F 21/00 714/38.1 |
| 2015/0121501 A1* | 4/2015 | Khalid | H04L 63/0815 726/8 |
| 2015/0178341 A1* | 6/2015 | Kumar | G06Q 30/0202 707/738 |
| 2015/0249677 A1* | 9/2015 | Tucker | H04L 63/1433 726/25 |
| 2016/0055326 A1* | 2/2016 | Votaw | G06F 21/45 726/19 |
| 2016/0055487 A1* | 2/2016 | Votaw | G06Q 20/384 705/44 |
| 2016/0078247 A1* | 3/2016 | Tucker | G06F 21/602 726/1 |
| 2016/0094574 A1* | 3/2016 | Hsueh | H04L 63/1433 726/23 |
| 2016/0127902 A1* | 5/2016 | Ciarniello | G06F 21/43 380/247 |
| 2016/0224810 A1* | 8/2016 | Shahidzadeh | H04W 12/126 |
| 2016/0239836 A1* | 8/2016 | von Mueller | H04L 63/0428 |
| 2016/0255090 A1* | 9/2016 | Johnston, Jr. | G06F 16/958 726/4 |
| 2016/0277193 A1* | 9/2016 | Sabin | H04L 9/321 |
| 2016/0352751 A1* | 12/2016 | Perrufel | H04W 12/06 |
| 2017/0150907 A1* | 6/2017 | Duffy | A61B 5/7435 |
| 2017/0187743 A1* | 6/2017 | Madou | G06F 21/566 |

FOREIGN PATENT DOCUMENTS

| | | |
|---|---|---|
| CN | 101385034 A | 3/2009 |
| CN | 101521608 A | 9/2009 |
| CN | 102025716 A | 4/2011 |
| CN | 102812451 A | 12/2012 |
| CN | 103634280 A | 3/2014 |
| CN | 103780396 A | 5/2014 |
| CN | 103988169 A | 8/2014 |

OTHER PUBLICATIONS

Gopalan, A. et al., "Policy Driven Remote Attestation", International Conference on Security and Privacy in Mobile Information and Communication Systems, MobiSec 2011: Security and Privacy in Mobile Information and Communication Systems, pp. 148-159, vol. 94, Springer, Berlin, Heidelberg, https://doi.org/10.1007/978-3-642-30244-2_13. No copy provided, per MPEP 609. Copy submitted in parent U.S. Appl. No. 16/886,454.

"Creating a Signed URL Using a Canned Policy", Amazon CloudFront, Amazon Web Services, Inc., 2015, 6 pages, [Online] [Retrieved on Jan. 17, 2016] Retrieved from the internet <URL:http://doc.aws.amazon.com/AmazonCloudFront/latest/DeveoperGuide/private-content-creating-signed-url-canned-policy.html>. No copy provided, per MPEP 609. Copy submitted in parent U.S. Appl. No. 16/886,454.

"Google Crawlers", Google, 2016, 2 pages, [Online] [Retrieved on Jan. 17, 2016] Retrieved from the Internet<URL:http://suport/google.com/webmasters/answer/1061943>. No copy provided, per MPEP 609. Copy submitted in parent U.S. Appl. No. 16/886,454.

"Googlebot", Google, 2016, 2 pages, [Online] [Retrieved on Jan. 17, 2016] Retrieved from the Internet<URL:http://www.google.com/bot.html>. No copy provided, per MPEP 609. Copy submitted in parent U.S. Appl. No. 16/886,454.

"Software Development Kit", Wikipedia, Last Modified Jan. 12, 2016, 1 page, [Online] [Retrieved on Jan. 17, 2016] Retrieved from

(56) References Cited

OTHER PUBLICATIONS the Internet<URL:https://en.wikipedia.org/wiki/Software_development_kit>-. No copy provided, per MPEP 609. Copy submitted in parent U.S. Appl. No. 16/886,454.
"Verifying Googlebot", google, 2016, 1 page, [Online] [Retrieved on Jan. 17, 2016] Retrieved from the Internet<URL:https://2upport.google.com/webmasters/answer/80553>. No copy provided, per MPEP 609. Copy submitted in parent U.S. Appl. No. 16/886,454.
"Web Application Firewall", OWASP, Last Modified Sep. 15, 2015, 1 page, [Online] Retrieved on Jan. 17, 2016, Retrieved from the Internet<URL:https://www.owasp.org/index.php/Web_Application_Firewall@g-t. No copy provided, per MPEP 609. Copy submitted in parent U.S. Appl. No. 16/886,454.
European Extended Search Report, European Application No. 15842077.8, dated Mar. 27, 2018, 7 pages. No copy provided, per MPEP 609. Copy submitted in parent U.S. Appl. No. 16/886,454.
PCT International Search Report and Written Opinion, PCT Application No. PCT/US2015/050245, dated Dec. 8, 2015, 23 pages. No copy provided, per MPEP 609. Copy submitted in parent U.S. Appl. No. 16/886,454.
PCT International Search Report and Written Opinion, PCT Application No. PCT/US2015/050245, dated Jan. 20, 2016, 23 pages. No copy provided, per MPEP 609. Copy submitted in parent U.S. Appl. No. 16/886,454.
U.S. Office Action issued in corresponding U.S. Appl. No. 14/855,101, dated Feb. 28, 2018, 25 pages. No copy provided, per MPEP 609. Copy submitted in parent U.S. Appl. No. 16/886,454.
U.S. Office Action issued in corresponding U.S. Appl. No. 14/855,101, dated Jun. 23, 2017, 22 pages. No copy provided, per MPEP 609. Copy submitted in parent U.S. Appl. No. 16/886,454.
First Chinese Office Action and Search Report, China National Intellectual Property Administration Patent Application No. 201580059863.9, dated Nov. 4, 2019, 14 pages. No copy provided, per MPEP 609. Copy submitted in parent U.S. Appl. No. 16/886,454.
Second Chinese Office Action and Search Report, China National Intellectual Property Administration Patent Application No. 201580059863.9, dated Jun. 24, 2020, 8 pages. No copy provided, per MPEP 609. Copy submitted in parent U.S. Appl. No. 16/886,454.
U.S. Office Action issued in corresponding U.S. Appl. No. 16/241,984, dated Dec. 16, 2019, 23 pages. No copy provided, per MPEP 609. Copy submitted in parent U.S. Appl. No. 16/886,454.

* cited by examiner

ANALYZING CLIENT APPLICATION BEHAVIOR TO DETECT ANOMALIES AND PREVENT ACCESS

CROSS REFERENCE TO RELATED APPLICATIONS

This application is a continuation of U.S. application Ser. No. 16/886,454, filed on May 28, 2020, which is a continuation application of U.S. patent application Ser. No. 16/241,984, filed Jan. 7, 2019, now U.S. Pat. No. 10,708,287, which is a continuation of application Ser. No. 14/855,101, filed Sep. 15, 2015, now U.S. Pat. No. 10,178,114, which claims the benefit of U.S. Provisional Application No. 62/050,449, filed Sep. 15, 2014, which are incorporated by reference in its entirety.

BACKGROUND

This invention relates generally to verifying security of an application executing on a client device, and more particularly to verification of the application when accessing a remote service at an application server through a network.

Application servers provide various content and services to client devices and applications executing on the client devices. These applications are referred to herein as a user-agent, or a user-agent application. As used herein, a user-agent is a software agent that acts on behalf of a user, such as a browser or a native application. As part of the Hypertext Transfer Protocol (HTTP), a user-agent will typically send a user-agent HTTP request to request content from another system. This request typically provides additional data describing characteristics of the user-agent, such as the identity of the user-agent providing the request, the platform on which the user-agent is executing (e.g., an operating system or a specific type of client device), and capabilities of the user-agent application (e.g., what languages the user-agent is capable of interpreting, or what input or output devices are available to the application). This helps servers identify the user-agent, and can let the servers optimize the response to that user-agent. This data describing the user-agent may be included in the request and may be part of an HTTP request header.

Application servers may provide HTML or other web pages for interpretation by the user-agent (i.e., a web browser) executing on the client device. These web pages may provide a variety of types of services that benefit from some verification of security and authenticity, such as banking, shopping, advertising, and so forth. Risks to an application's security from the perspective of the application server include cross-site scripting, viruses, malware, and automated bots. In general, attacks may prevent a user from properly viewing content provided by an application server, or request or provide unauthorized information to an application server. In the advertising context, requests for content or advertising by an automated system (e.g., a bot) may trigger presentation of an advertisement that was never viewed by an actual user, falsely triggering payment by an advertiser for the impression.

This application describes protections for Application Servers or Web Services from a variety of attacks and security threats, for instance, from potentially malicious user-agents, and protecting its customers' user-agents from various attacks like cross-site-scripting (XSS) or Man in the Middle attacks (MitM).

SUMMARY

A user-agent application on a client device accesses a service at an application server. When the user-agent application accesses and provides the service to the user of the client device, the user-agent application requests a set of security tests from a security verification system. In one embodiment, the application server provides an instruction to the user-agent application to access security tests from the security verification system. This instruction may be a script instructing the user-agent to access the security verification system (e.g., via bootstrap code). The user-agent accesses the security verification system and provides an identification of the user agent and characteristics of the user-agent. The user-agent may also provide an identification of the application server or an application transaction identifier provided by the application server. The security verification system identifies characteristics of the user-agent from the request for security tests, and identifies a set of security tests for the user-agent to perform.

The set of security tests are executed by the user-agent application and the test results are sent to the security verification system. The security tests may be executed by a script or other security module that is executed by the user-agent application. The security tests evaluate aspects of the user-agent application, and may confirm that the user-agent is the user-agent that it purported to be when it requested the security tests, that the user-agent application is displaying and interpreting the service from the application server in an expected way, that the user-agent application is actually being operated by a user, and so forth. To evaluate the user-agent application, these security tests may evaluate a user's interaction with the user-agent application, identify a user-agent application's display of the service accessed from the application server, identify a user-agent application's interactions with the application server, and identify capabilities and features of an executing environment of the user-agent application. Thus, these tests may evaluate the user-agent application during access of the user-agent application to the application server.

Using the test results, the security verification system compares the test results to expected test results for the user-agent. The comparison is scored and a security token for the user-agent is generated and provided to the user-agent application. The presence of the token itself may provide verification of the user-agent, while in other embodiments the token may specify specific tests performed on the user-agent or the resulting security score. The security token is provided by the user-agent application to the application server for verification, and the application server may permit or deny further access to the application server or performance of an action at the application server based on the token. In one embodiment, rather than or in addition to providing a security token to the client device, the security verification system provides the security test data or score or an aggregation thereof from a plurality of client devices to the application server to verify the security of the user-agent applications that accessed the application server. In this embodiment, rather than using the security test results or security scores to determine whether to grant access to the application server, the application server may use this information for other purposes to evaluate user accesses. For example, an application server that provides advertisements may use test results or scores indicating access by a non-user (e.g., a bot) to determine when an advertiser should not pay for an impression or click-through for an advertisement, or decide to show different content for suspicious users (typically cheaper ads), or direct the user to another other site or content.

When the user-agent application does not provide security test results that are fully consistent with the expected results, the security verification system may provide additional security tests to the client device for execution, and may provide a notification for display to the user of the possible security risks, depending on the particular test that provided an unexpected result.

At the client device, the security module that executes the security tests may provide additional functionality to the client device. First, the security module may monitor actions of the user-agent and prevent actions that are known to be associated with a vulnerability, such as accessing another system on the network associated with malicious activity. Second, the security module may insert the token into communications with the application server to provide the token to the application server and verify the security tests of the application server. Finally, the security module may monitor actions performed by the user-agent application and report the actions to the security verification system. The security verification system may re-score the user-agent and modify or revoke the security token based on the action.

As a result, security for a user-device can be verified by a security verification system that analyzes operation of the user-agent application as it accesses the application server. Because the security tests are requested from the security verification system, the security verification system can provide up-to-date tests to the user-agent and update the tests as the user-agent identification and characteristics change over time. By providing the security module to be executed by the user-agent, the security module can prevent additional tampering and ensure that the token provided by the security verification system is provided to the application server.

When no token is provided to the application server, the application server may deny access to its resources, which enforces use of the security module executed by the user-agent.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
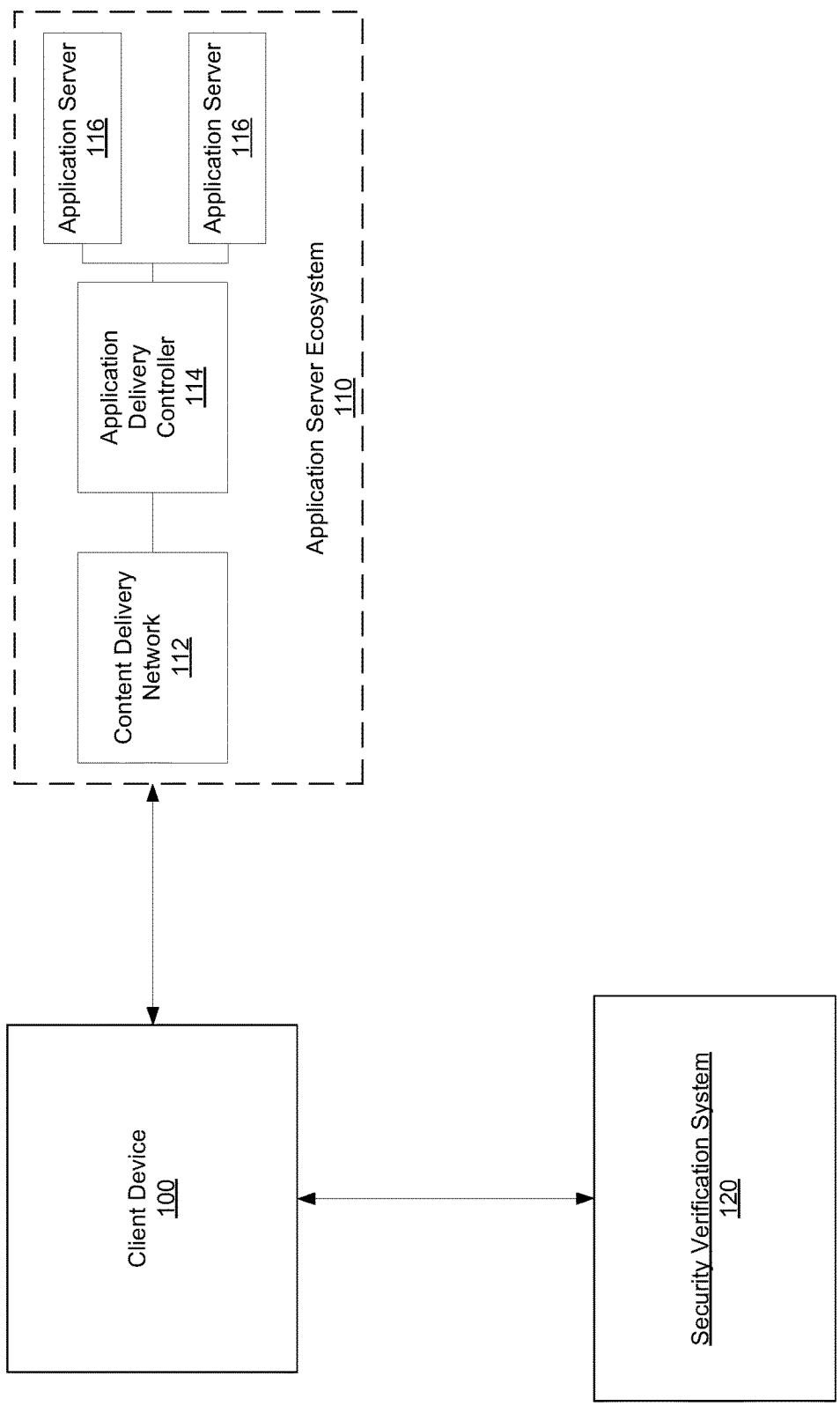
FIG. 1 illustrates an application server ecosystem accessed via a network according to one embodiment.

FIG. 1 illustrates an application server ecosystem accessed via a network according to one embodiment.

In this environment, a client device 100 executes a user-agent application which requests application services from one or more application servers 116. When the client device accesses resources from the application server 116, the user-agent application executing on the client device 100 receives a security module from the security verification system 120 and executes a series of tests specified by the security verification system 120. Generally, these tests may describe the operating environment of the client device when using the resource as interpreted by the user-agent application executing on the client device. For example, the resource provided by the application server 116 may include a webpage with hypertext and various scripts for execution by the client device 100. As an example, the tests specified by the security verification system 120 identify characteristics of the application when rendering the webpage and scripts for the user. As further described below, the security verification system 120 verifies the results of these tests and determines the authenticity of the presentation of the application resource to the user and verifies the user's application is operating as expected.

The client device 100 application browser, indicating the client environment (on the upper left) is a computing device that has a user-agent application installed that accesses the application server 116. This may be a web browser or another type of native application executing on the client device 100.

In this example, when the client device accesses an application server, it identifies a URL for specific content at a page identified by the URL. In a web browser application, this triggers an HTTP request to be sent by the browser application to an application server 116 through a network, such as the Internet. This HTTP request may be encrypted, such a HTTPS connection (Hypertext Transfer Protocol Secure) which layers HTTP over a Secure Socket Layer (SSL) or Transportation Layer Security (TLS).

In this example application server ecosystem 110, one or more application servers 116 provide the requested resources to the client device 100. The server-side resources are illustrated in this example as a part of an application server ecosystem 110. In this example, the application server 116 is accessed at a content delivery network 112 via an application delivery controller 114. Typically the application server 116 is in a data-center (physical or virtual), having the web-server, but also a data-base server, and additional services that the application server 116 accesses to provide the service.

In this example, in front of the web-servers is an application delivery controller 114, is a device that typically resides in the data-center, front-ending the web-servers. The application delivery controller 114 provides load-balancing services, security, caching, and other services to manage consistent delivery of application resources.

There could be one, or multiple application delivery controllers 114 to provide high availability and scalability reasons. An application delivery controller 114 server may also be a virtual server, for example when the application is hosted at a cloud provider (for instance, an Infrastructure as a Service (IaaS) provider).

In this example, the application server ecosystem 110 also includes a content delivery network 112. When the client device 100 requests access to an application server 116, the client device 100 receives the address of an optimal CDN server (typically close to the user), and that server will serve the page, or application to the user—either by going back to the origin server (the ADC and web-servers), or if the content is cached at the CDN server, serving it directly from cache.

The application server 116 may reside in multiple data-centers and virtual datacenters, use several or no application data controllers, use cloud services such as IaaS, PaaS (Platform as a Service) or SaaS (Software as a Service), and may also utilize multiple content delivery networks, or use no CDN service at all.

Figure 2:
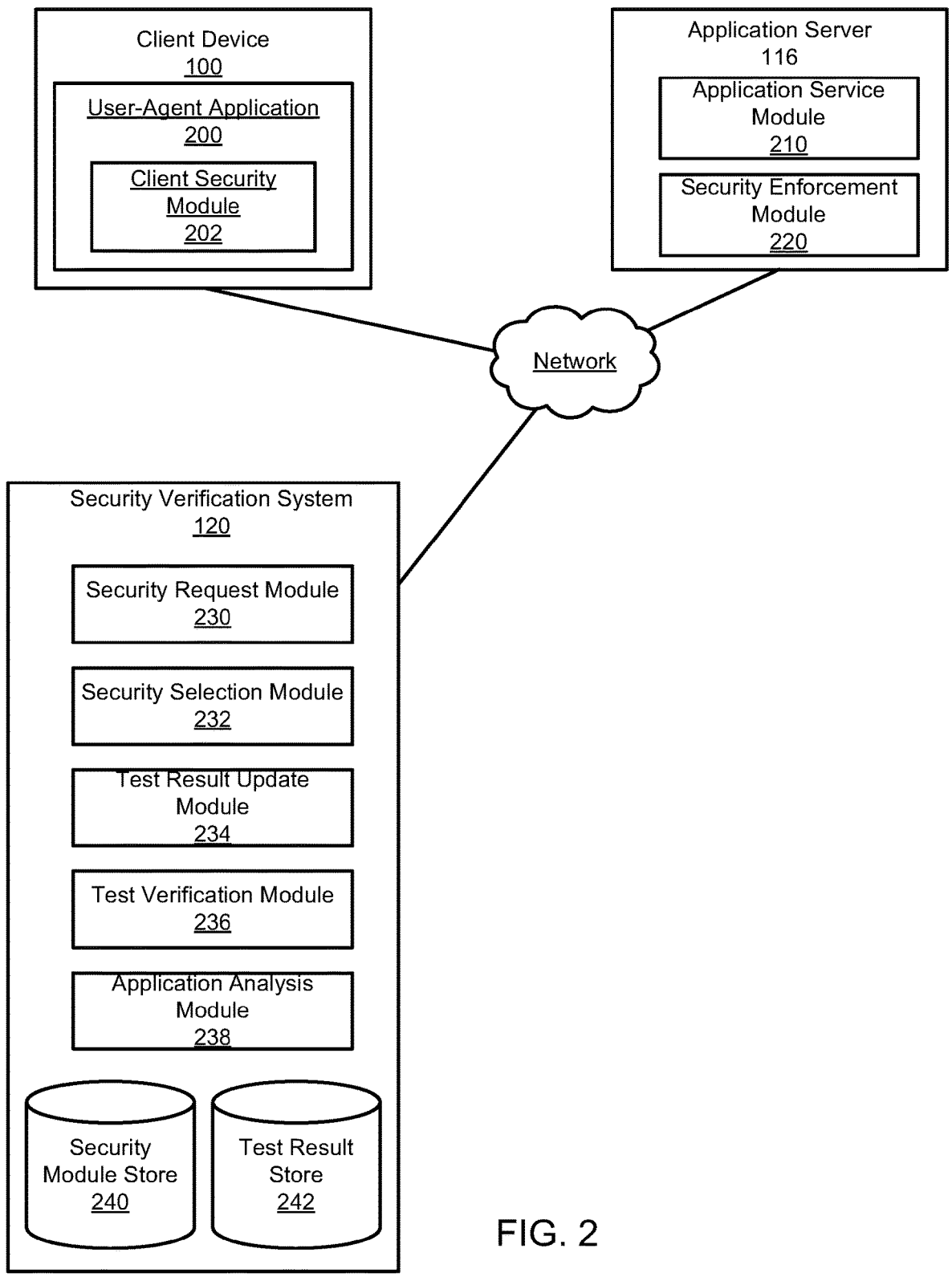
FIG. 2 illustrates components of the client device and security verification system in one embodiment.

FIG. 2 illustrates components of the client device 100 and security verification system 120 in an environment. In this environment, a single application server 116 is shown, though the security enforcement module 220 may be performed by any of the entities shown in the application server ecosystem 110, including embodiments where it is performed on multiple such entities.

The application server 116 provides an application service module 210 that provides the content and services requests for the user. In this example, the application server 116 also includes a security enforcement module 220. The security enforcement module 220 enforces a security policy at the application server 116 (or at another system associated with the application server ecosystem 110). For example, this security policy may allow access to specific pages only to requests coming from a specific set of IP addresses, or requesting some further validation provided with a request, such as an access token, or use the token to restrict access, log access or show different options based on the token value.

Thus, as part of the policy enforcement, the security enforcement module 220 validates security tokens, such as those issued by the security verification system 120. The token validation may be different between different implementations—for instance, one content delivery network provider can implement the token mechanism and the token validation in a different way than another content delivery network, and each may do it different from the way a specific application delivery controller implements a policy. In general, each token may be validated to verify its security (cryptographic strength), authenticity (issued by the security verification system 120), and approved for the specific content of the application server 116 as further described below.

The token validation validates that a token is provided with the request, that the token is valid for the specific URL requested, the request comes within the timeframe indicated in the token (if indicated), the requested URL (including parameters if there) match the URL pattern for which the token was provided. Additional conditions can include geographic restrictions, user restrictions, among others. The token is typically cryptographically signed, so that the security verification system security enforcement module 220 can validate that the token is valid and properly signed by the security verification system 120, while it will be hard for an unauthorized entity to generate a valid token on its own.

Thus, the security enforcement module 220 receives tokens provided by the client device from the security verification system and determines whether to permit access to or perform an action on the application server 116. When a user-agent application 200 does not provide that token, the user-agent application may be denied access to the requested service or a security loader may be provided to direct the user-agent application 200 to retrieve a client security module 202 to perform the appropriate tests to retrieve a token from the security verification system 120 as noted below. In some configurations, the application server 116 analyzes the security score or test results included in the token to determine whether to grant requested access. For example, the score may be required to be above a certain threshold to permit access, or a user-agent application that fails to pass a particular test, may be refused access.

The client device 100 provides user-agent application 200 which is executed by the client device 100 and operated by the user to access requested services at the application server 116. The operation of user-agent application 200 is analyzed by the security verification system 120 to determine whether the user-agent application 200 is operating as expected. The client security module 202 executes within the user-agent application and analyzes the operation of the user-agent application pursuant to tests designated by the security verification system 120. In some cases, the application server 116 provides a security loader that serves as a boot-loader to retrieve and initiate the client security module 202 on the client. For instance, when the client is a browser, the security loader may be a javascript "tag" (short javascript code) that has basic logic to contact the security verification system 120 and request the client security module 202 and load it at the user-agent application 200. Thus, when the user-agent application 200 is a web browser, and the client security module 202 may be loaded based on a javascript code or other instruction from the application server 116. In other embodiments, the user-agent application 200 may be a native application, such as an application for a mobile device. In this case, the security loader may be added to the application and included as part of a software developer kit, rather than retrieved from the application server 116. In another embodiment, the client security module 202 may be a part of the native application and be capable of performing security tests as instructed by the security verification system 120, rather than retrieving the security module 202 from the security verification system 120.

When the user-agent application 200 accesses the security verification system 120, the user-agent application 200 provides information about the user-agent application 200. For example, the user-agent application 200 may provide the specific model and type of client device, an operating system and operating system version of the client device, an identity and version of the user-agent application, and specific capabilities of the user-agent application, such as the ability to execute certain scripting technologies. This information may be provided, for example, in an HTTP request header. The user-agent receives a set of tests to perform from the security verification system 120. The security verification system 120 may provide the client security module 202 configured to perform the required tests, or the client security module 202 may already be present at the client device 100 and perform the tests requested by the security verification system 120. The security tests provided by the security verification system 120 may differ based on the user-agent application and characteristics of the user-agent application described in the request. Thus, the tests may provide information to determine whether the tests performed at the client device are consistent with the expected user-agent application behavior.

The client security module 202 hooks into the user-agent application 200 execution and may access various functions and evaluate the status of the user-agent application 200. For example, in a browser application, the client security module 202 may access browser functions such as a javascript engine, core objects associated with a page such as HTML Elements, document.cookie, etc. The client security module 202 then begins profiling the state of the application based on the tests provided by the security verification system 120. For example, it may begin identifying the outbound links from the user-agent application 200, user input behavior, the number of HTML, Javascript (JS), and Cascading Style Sheets (CSS) elements on a page, the different Document Object Model (DOM) elements, forms and other aspects of the page.

These tests may include determining various javascript capabilities or other scripting capabilities of the user-agent, for example to validate that javascript code executes in the user-agent application. Additional tests may be specific to the reported user-agent, for example attempting to access local storage or specific objects and elements specific to the reported user-agent.

The tests may also include evaluating information about the user-agent and its activity, such as identifying and inspecting specific cookies maintained by the user-agent.

The tests may also track user activities, such as mouse movement, a mouse cursor hovering over specific elements in the page, click activities, timing characteristics of different user activities, and so forth.

The tests may also evaluate a history of activities by the user-agent application, such as timing of access to a specific object can indicate if the object was already in a cache (indicating it was already requested in the past by the user-agent) or if the user-agent application retrieved the object over the network. Another test is to evaluate browser objects like the history object.

Thus, client security module 202 runs a set of tests as determined by the security verification system to collect data and profile the client. The tests will differ based on the client (type of browser, Operating System (OS), versions of both), based on the specific activity the client requested from the application server 116 (e.g., watch the homepage, search a catalog or perform some transaction), and based on the known history of this client (if a user-agent was validated in the past).

In one embodiment, the collected data is anonymized so that it can be transmitted and stored without breaching the end-user's privacy. For example, no personal information such as individual typed keys is collected, while activities and patterns of the user and fingerprints of the environment (browser, OS, etc) may be used.

The various test results collected by the client security module 202 is provided to the security verification system 120 to profile the specific client and current activity or interaction. Thus, a combination of specific data that is collected may indicate whether the user-agent application 200 is actually behaving like the user-agent application it stated in its request for verification, or if the actions don't resemble other similar user-agent applications accessing this application server 116.

The security verification system 120 includes various modules and data stores for providing security tests, and analyzing the resulting tests for a client device. The security verification system 120 may be implemented by multiple servers in multiple locations, for various modules, and so forth. The service itself may include a content delivery network, application delivery controller, and other services or servers.

The security module store 240 maintains a repository of client security modules 202 for various user-agent applications 200 and a repository of various tests to be performed by the client security modules 202. The security module store 240 stores multiple client security modules 202 so that each user-agent application can get an optimal client security module 202 based on characteristics of the user-agent application. For instance—the security module store 240 may include a specific client security module 202 for specific versions of a particular user-agent application, and another client security module 202 for another version of that user-agent application and a third client security module 202 for a different user-agent application.

When the security verification system 120 receives a security verification from a client device 100, which may be from a security loader in a javascript tag, the request is received by a security request module 230. The security request module 230 operates as a front-end to coordinate requests with the components of the security verification system 120. When a request for security verification is received, it is transferred to a security selection module 232 that selects a client security module 202 and appropriate security tests for the user-agent application characteristics designated in the request. This information may include which application server 116, or URL initiated the security request, the user-agent application type and version (e.g., based on the user-agent HTTP request header, or from additional information reported by the security loader).

When the client security module 202 reports data to the security verification system 120, that reported data on test results is processed, enriched, and then stored in the test result store 242 by the test result update module 234. To enrich the test results, the client security module 202 may add additional information to the test results, such as an IP address of the user-agent, a geographic location associated with that IP address, a particular service associated with the IP address, among other information that may be derived from the access to the security verification system 120. Using the stored data, profiles for individual user-agent applications can be determined for accesses to particular application servers 116 or to individual resources at the application server 116. These profiles may be generated using machine learning techniques to determine a normal behavior. This generates a baseline for user-agent application and user test results. The test result update module 234 controls the process of storing, updating and analyzing the data to determine the baseline behavior and attributes for a user-agent, and expected patterns of behavior for users.

After the data that is collected from the client security module 202 for a given access is stored, it is then analyzed by the test verification module 236, which compares the data to the data collected and analyzed so far in the profile store. If the received test results doesn't match the expected pattern—the module will detect an anomaly. For instance, an anomaly may be identified if the client is identifying itself as a CHROME® browser but a window.chrome object doesn't exist (i.e., an object known to exist in the specific user-agent application of that type), or if the client security module 202 reports for a specific resource (e.g., a URL) at the application server 116 that the user-agent application has rendered a page with 17 divs in the page while typically for this user-agent application only 12 divs are reported. In addition to identifying specific anomalies based on the tests performed by the client security module 202, the application of the profile may also generate a security score for the test results. When an anomaly is detected, the test verification module 236 may instruct the client security module 202 to block a specific transaction, or display an error message to the user.

When the reported test results are valid and indicate that the user-agent application 200 and the user are legitimate, a token is generated for the user-agent application 200 and provided to the client security module 202. In other embodiments, a token may be generated for the user-agent application even where the test results to not indicate fully validity of the user-agent application 200. In this circumstance, the token may embed information indicating the test results, such as which tests were not passed, or a security score to indicate the extent of verification of the user-agent application 200.

If the test verification module 236 doesn't reach a conclusive result, it may continue to analyze the user-agent application 202 until it reaches a conclusion. The test verification module 236 may send additional tests for the client security module 202 to perform and report to the security verification system 120. For example, to collect and report additional data, or perform specific tasks. For example, if the test results indicate that user activity in the user-agent application 202 do not appear to correspond to previously profiled user behavior, the test verification module 236 may provide a Completely Automated Public Turing test to tell Computers and Humans Apart (CAPTCHA). If the test results indicate that the user-agent application is not performing scripting functions as expected or that the user-agent application does not have expected objects, the additional test may include a scripting math problem to be performed by the user-agent application 202 or a script requesting performance of unusual scripting functionality to confirm the user-agent application 202 can perform the functions associated with that user-agent application, or to delay the user-agent in a way that would be unnoticeable to a legitimate user, but bothersome and uneconomic for an automated attacker.

In another example, the test verification module 236 may wait and collect additional data on following pages or requests performed by the client. In this case, the test verification module 236 may provisionally permit the user-agent application to proceed and generate a token for the user-agent application. This token may indicate that the user-agent application failed one or more tests, or reflect a lower security score.

In some cases, an anomaly may actually be an indication that the page or service provided by the application server 116 was changed, rather than an indication that there is a risk to the user-agent application 200 or that an intermediary has injected the malicious scripts or information. For instance, an application server 116 introducing a new version of the page is likely to change the number of divs in the page, number of scripts, and the layout of the page.

When several reports show a similar anomaly, the test verification module 236 reports the change to the application analysis module 238. The application analysis module 238 may directly access the application server and request the page (or application) and profile it to determine if the information from the application server 116 has changed.

As a result, the application analysis module 238 may provide an alert or notification to the admin of the application notifying on the application change. This helps the administrator of the application server 116 verify if this was a planned change, or if the change is a result of an attack. Using the anomaly identified by the application analysis module 238, a new baseline may be generated by the test result update module 234.

Figure 3:
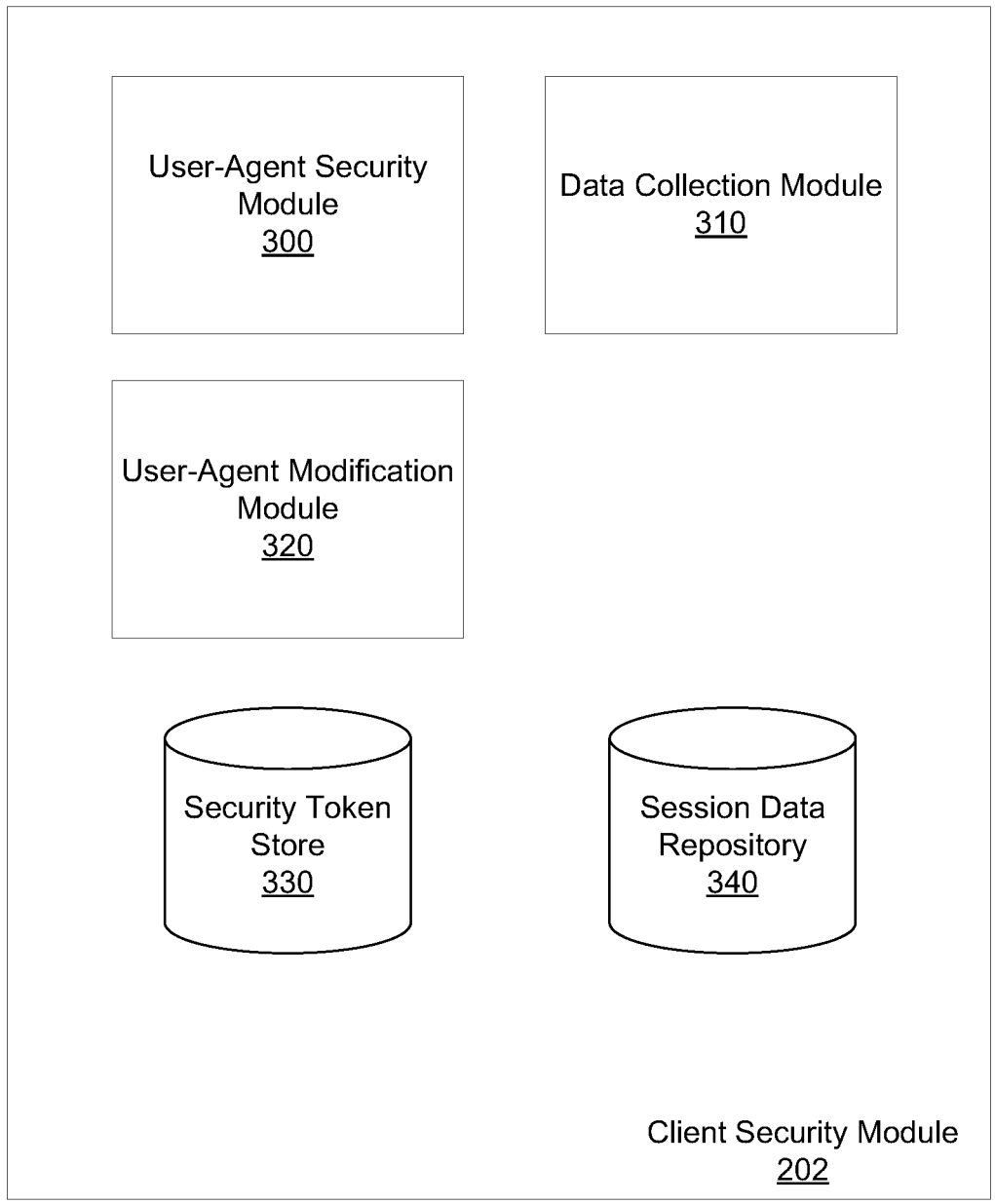
FIG. 3 shows components of the client security module 202 according to one embodiment.

FIG. 3 shows components of the client security module 202 according to one embodiment. Various client security modules 202 for different user-agent application may have more or fewer of these components. As part of the initial security tasks, the user-agent security module may provide additional monitoring and prevention of vulnerabilities of the user-agent application or from known malicious servers. For example, the user-agent security module 300 may monitor all requests that send data from the user-agent application, such as HTTP POST requests, and block requests that attempt to send data to an unknown or unauthorized server (a server which isn't in the specific site's whitelist for instance, or the list of known servers as detected and profiled by the security verification system 120).

The data collection module 310 monitors and observes the page, the user-agent application, and the user's activity, and collects this data, to report the data back to the security verification system 120. As examples of the data this module can collect: characteristics of a page such as a number of divs, number of scripts, and other elements of the page; characteristics of the client—such as specific objects that indicate the browser type and version, existence of objects in cache, referrer checking (where did the user come from), and existence of specific user-agents, such as rendering test and objects using a canvas object; and activity of the user, such as mouse movement, clicks, timing between specific actions, and sequence of pages within the site. The particular information collected by the data collection module 310 may be specified by the tests indicated by the security verification system 120.

This data is aggregated by the data collection module 310, summarized for efficient transmission and to avoid transmitting secret or private information, such as specific data typed by the user.

Once the collected data is reported to the security verification system 120, the security verification system 120 may issue a token and will provide it to the client security module 202. The client security module stores the token in a security token store 330 with parameters that identify the context relevant to use of the token, such as a time period in which the token is valid, and a list of applications servers 116 or pages that the token is valid for.

Once a token is available for a specific page or application/action, the user-agent modification module uses the token to append it to the specific requests made by the user-agent application 200 to the application server 116. For example, in an online store, when protecting the action of adding an item to the shopping cart, that specific action may require a token. The user-agent itself may not include the token. Once an appropriate token exists in the client security module 202, the application modification module modifies a request by the user-agent application, for example by modifying code in a Document Object Model (DOM) that adds an item to the shopping cart, by appending the token to it. The token may be appended by adding it to the URL, by creation of a cookie containing the token, or in any other format or method the token is validated).

The user-agent modification module 320 may also modify the application in the opposite case—when the security verification system determines that the activity should be blocked (malicious user, or identifying that the user was attacked). In that case—the specific script, or code performing a transaction can be wrapped, or replaced by a code that will issue a warning to the user and will prevent the actual transaction from happening.

The client security module 202 also has a session data repository 340 in which it can store data between pages in the same session, and between sessions to help better manage and protect the client and application. This can include session data, specific libraries and modules that it received from the security verification system 120, and specific test instructions.

Figure 4:
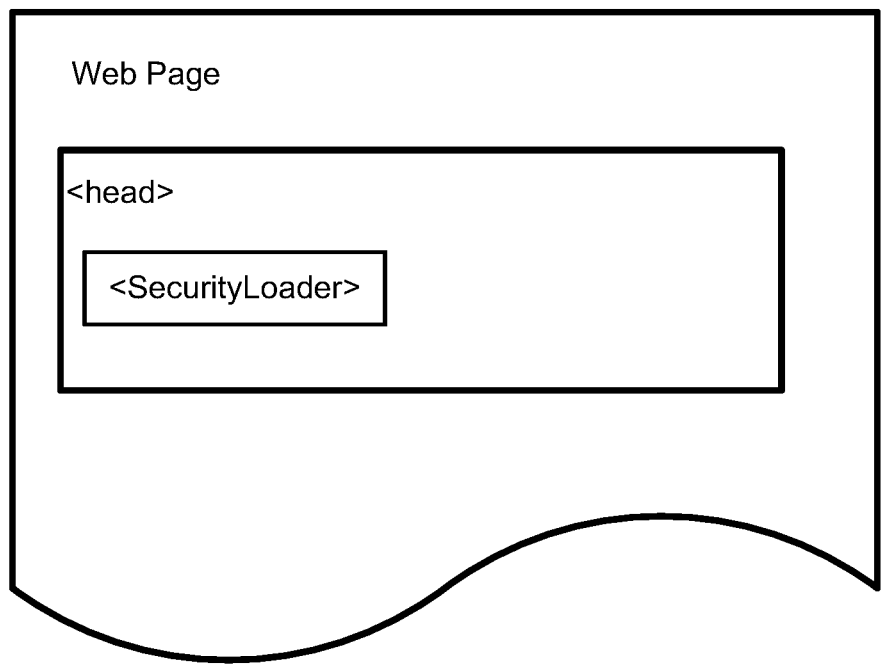
FIG. 4 shows a web page including a security loader according to one embodiment.

FIG. 4 shows a web page including a security loader according to one embodiment. In this embodiment, a security loader instruction is added as a javascript tag within an HTML header, e.g., a <head> tag, so that the security loader prompts the user-agent to load the client security module 202 at the beginning of the page.

Figure 5:
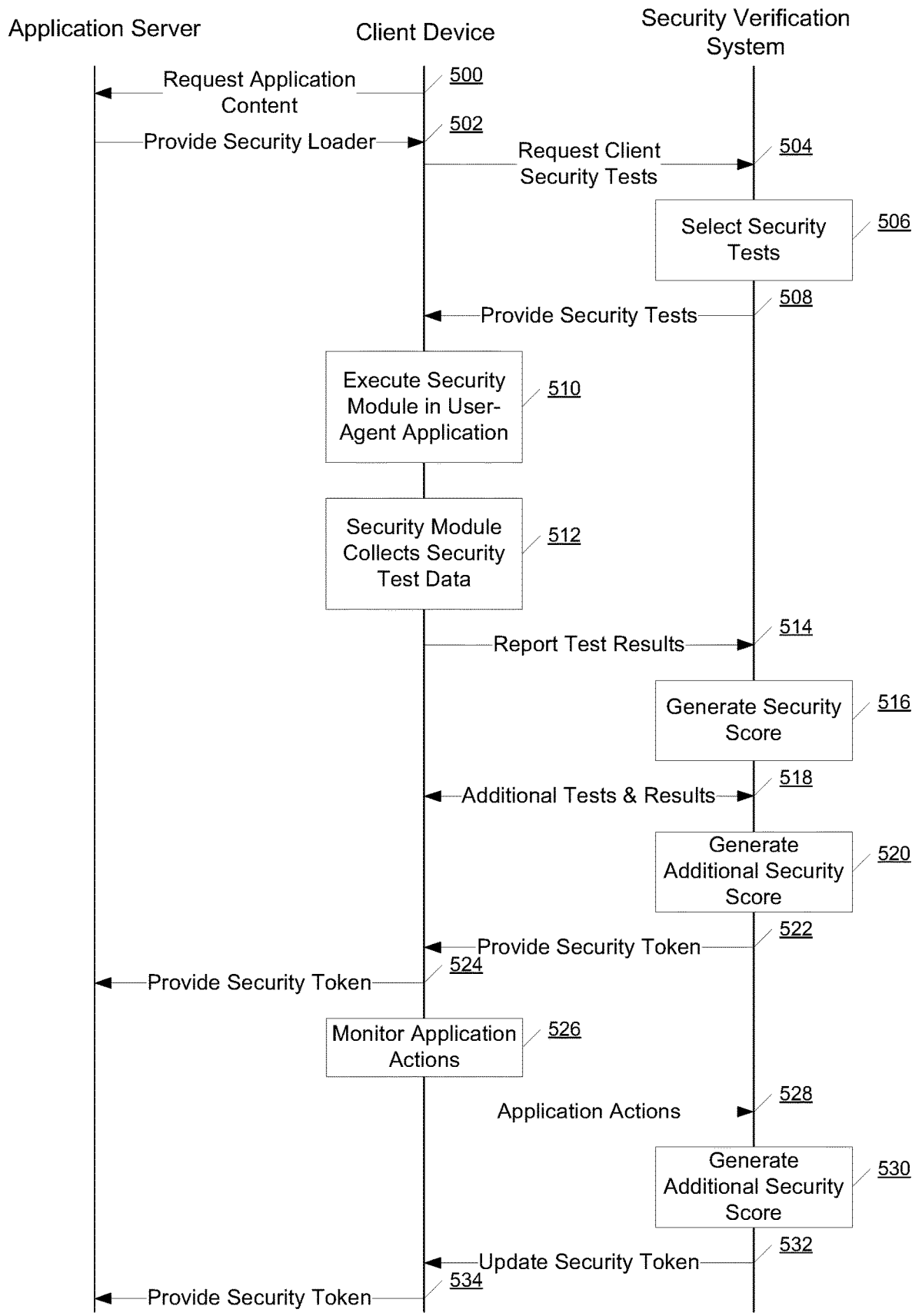
FIG. 5 shows an interaction diagram between the application server, client device, and security verification system according to one embodiment.

FIG. 5 shows an interaction diagram between the application server, client device, and security verification system according to one embodiment. Initially, the client device requests 500 application content from the application server using the user-agent application. The application server provides 502 a security loader to the client device directing the user-agent application to retrieve security tests and if applicable a client security module 202. The user application may check for whether there is a cached version of the client security module 202, and if so provide an indication of the cached client security module 202 in a request 504 for client security tests as indicated by the security loader. The request 504 to the security verification system indicates characteristics of the user-agent application, such as the version of the user-agent application, operating system, content requested at the application server, and so forth as indicated above.

Using the request, the security verification system identifies 506 the appropriate set of security tests for the client device to perform and provides 508 the security tests to the client device. The security verification system may also provide the client security module to the client device, which performs the designated security tests. Next, the client device executes the security module in the user-agent application 510, which collects 512 the designated security test data, such as data about the application content, the user-agent application, and user actions in the user-agent application.

Next, the test results are reported 514 to the security verification system, which stores the data and analyzes the data with reference to profiles of other user-agents accessing the application content as described above, which may generate 516 a security score describing the test results. The comparison may be based on expected client characteristics (e.g., the user-agent behaving like the user-agent it purported to be), expected profile of the application content when accessed by the user agent (e.g., the number of elements on the page and other actions requested by the application content to be performed by the user-agent application), and user activity (e.g., mouse movement, click activity, and event timing).

If there are anomalies or other results from the security tests that are inconsistent with the expected test results, the security verification system may further interrogate the user-agent application by instructing the client security module to perform additional tests and report 518 the results of those additional tests to the security verification system. These additional tests may be used to generate an updated security score. If there were no anomalies, no additional tests are performed in some embodiments.

Next, the security verification system generates and provides 522 a security token to the client security module. As noted above, the security token may specify the security score of the tests performed and test results of the security tests. The security token may indicate that the score is positive, or negative, and may include whether specific tests were passed or failed. When the client device accesses the application server, the client security module 202 inserts the security token 524 to permit the application server to verify that the client device has been tested by the security verification system. As the client device continues to access the application server, the client security module continues to monitor 526 activities at the user-agent application, such as accesses to web pages, changes in the requested application content at the application server, and so forth. These activities are reported to the security verification system 528 which may determine 530 a further security score and update the security token 532. The updated token is provided 534 to the application server 534 by the client security module.

Figure 6:
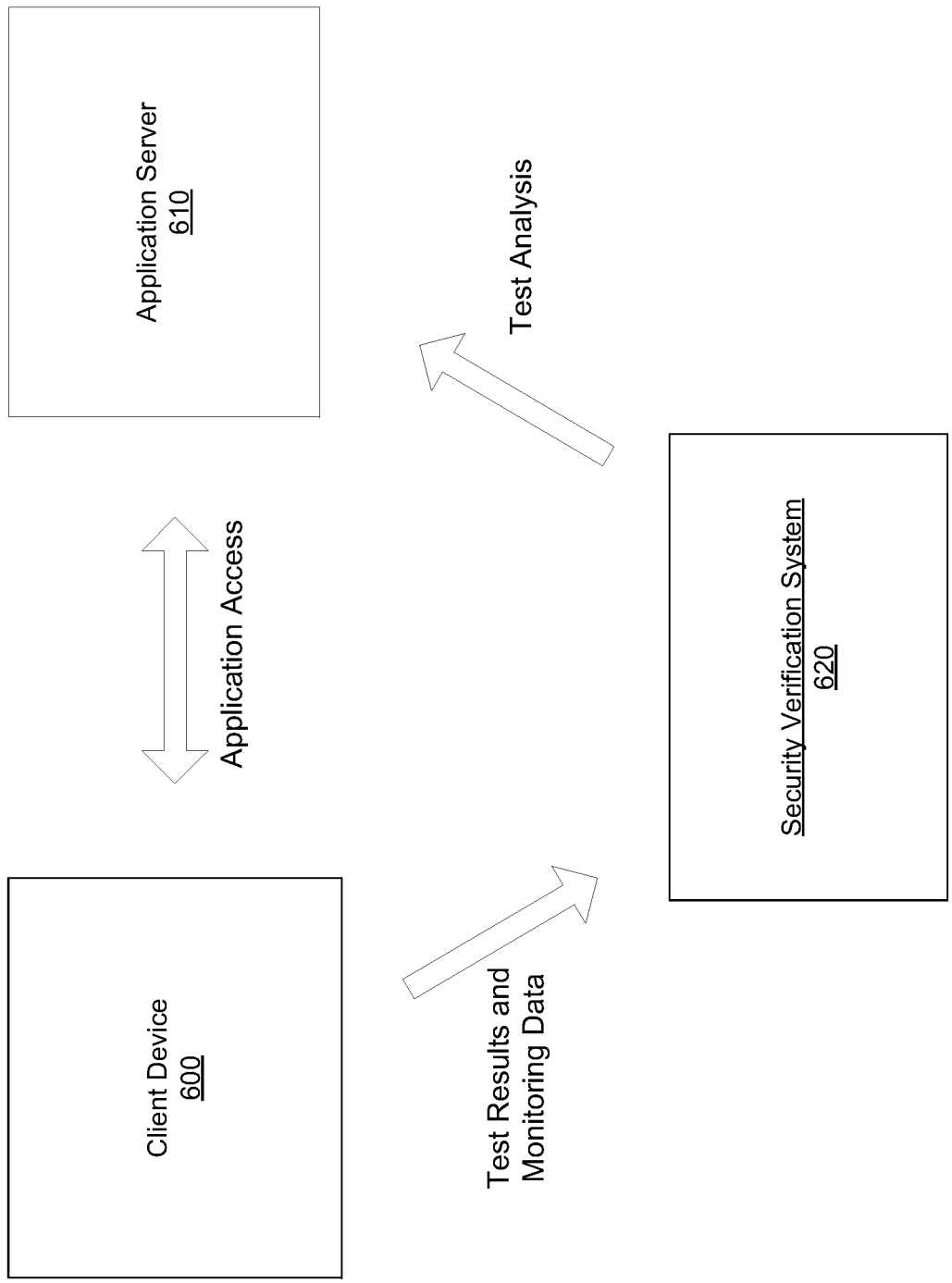
FIG. 6 shows an environment in which the application server receives a security score or test verification information directly from the security verification system.

FIG. 6 shows an environment in which the application server 610 receives a security score or test verification information from the security verification system 620. These systems generally operate similarly to the client device 100, application server 116, and security verification system 120 previously described. In this embodiment, the security verification system 620 may not issue a token to the client device 600 to provide access to the application server 610, and the application server 610 may not enforce a requirement for a token. As an alternative to the token enforcement (and in some applications, in addition to the token), in this example the security verification system 620 provides the test analysis to the application server 610. This test analysis may include the security score and security test analysis, such as individual tests that were not passed by the client device 600. The analysis may also be provided as an aggregate across many client devices 600 to provide more general data to the application server 610 about the behavior of the client devices that access the application server 610.

As one application of this system, the application server 610 may provide advertisements or other content for which third parties are responsible for payment. However, the third parties do not want to be responsible for paying for advertisements that are not presented to actual users. By analyzing test results from client devices and aggregating them at the security verification system 620, the security verification system 620 may provide information to the application server 610 that describes which of the accesses to advertisements actually represent impressions to users, for example by identifying bots or other non-user interactions, but avoids any overhead of requiring the application server 610 to analyze token information.

Using the client security module and security verification system as described herein provides several benefits and protection from various malicious actions and the presence of the valid token to the application server provides verification that the user-agent application is the user-agent application it purports to be and that the system is actually operated by a user rather than an automated bot. First, if malicious action blocks execution of the client security module, the user-agent application is unable to receive a token for accessing the application server, and use of the application server may be prevented. Second, if the system is operated by a bot that spoofs the activity of another user-agent (for example, by stating in its user-agent header in a HTTP request that it is another user-agent), such a bot typically will be unable to reproduce the user interactions or user-agent operations expected of the user-agent application. That is, the bot may fail to provide expected elements or objects of the user-agent application, and may be unable to process the additional scripting requests from the security verification system. For example, the bot may purport to be a Chrome browser user-agent, but not have a window.chrome object. As another example, mouse movement, touch events, and other user interactions differ for a bot, and the bot may be unable to respond to the additional testing.

In another example, an attacker may attempt to insert an attack on the application content provided by the application server and insert additional information into the content provided by the application server or otherwise change its scripting or contents, for example through cross-site scripting. In this example, the behavior of the user-agent application in processing the application content will differ from the behavior profile of other user-agent applications processing that application content and this difference may be identified by the security tests. In operation, the client security module begins to report information about a page provided by the application server, such as the location of browser characteristics, access to form data, location and origin of scripts on a page and so forth. When these scripts and locations are provided to the security verification system, the security verification system may identify that an additional script or additional division in the page is present relative to other user-agent application accesses to that application content and decline to issue a token (or issue a token indicating the score of this specific interaction) or prevent the user-agent application from submitting data from the suspicious script.

Because the client security module resides on the user-agent application, the client security module may also identify an attempt to perform unexpected or unauthorized activities in the application, for example to initiate a POST request, and block it to prevent a cross-site request forgery. In a cross-site request forgery, a trusted connection may already exist to an application server. The malicious code attempts to perform a post request that may otherwise occur transparently to the user. Because the post requests from the user-agent application are monitored by the client security module and reported to the security verification system, these attempts at unexpected POST requests may be identified and prevented. This may trigger the security verification system to update or revoke a token, or issue a warning to the user through the client security module. This may prevent, for example, a script from collecting credit card and password information and initiating a POST request to a third-party system. Thus, the combination of the client security module and the requirement for a token validated by the security verification system to access the application server prevents both unexpected access to third-party sites and unverified access to the application server.

As an additional benefit, because the application server provides a security loader, rather than the security verification system itself, the application server need not constantly update its set of security protocols, which can be centrally managed by the security verification system for many application servers.

Further—in most cases, the client security module presents a warning message indicating why the activity was blocked by providing the specific suspicious activity. This is helpful if an actual user is blocked, or if a valid API call is blocked. While bots can prevent the client security module from blocking the bot's activity in some cases, for example by blocking the client security module, the bot will still be blocked by the application server's security policy, as they will not get the required token.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
   selecting and sending over a network, by a security verification system to a plurality of client devices executing user-agent applications accessing services from an application server, sets of security tests which, when executed by the user-agent applications, are indicative of whether behaviors of the user-agent applications are consistent with expected behaviors for the user-agent applications accessing services from the application server;
   receiving, at the security verification system from the client devices, sets of test results from the execution of the sets of security tests by the user-agent applications;
   generating and sending, by the security verification system to the client devices, security tokens based on the sets of test results,
   wherein the security tokens verify security of the user-agent applications, and security policies at the application server are enforced based on the security tokens, wherein each of the security tokens is cryptographically signed for validation by the application server, and wherein each of the security tokens comprises a security score indicating whether access to the services at the application server is granted or denied.

2. The method of claim 1, further comprising:

receiving, at the security verification system from the client devices, requests to verify security of the user-agent applications, the requests specifying one or more characteristics of the user-agent applications executing on the client devices, wherein selecting the sets of security tests is based on the one or more characteristics of the user-agent applications.

3. The method according to claim 2, wherein the one or more characteristics of the user-agent applications comprise a type of a user-agent application and a version of the user-agent application, and wherein identifying the sets of security tests based on the one or more characteristics of the user-agent applications comprises identifying the sets of security tests from a plurality of different sets of security tests, the sets of security tests associated with different combinations of types of user-agent applications and versions of user-agent applications.

4. The method of claim 1, wherein the user-agent applications comprise web browsers, and the sets of security tests include scripts for execution by the web browsers.

5. The method of claim 1, further comprising:

responsive to the security score being below a threshold:

providing an additional set of security tests to the client device for execution by the application; and receiving, from the client device, an additional set of test results reflecting the execution of the additional set of security tests, wherein generating the security token is further based on the additional set of test results.

6. The method of claim 1, wherein the security tokens for the user-agent applications comprise identifications of the sets of security tests.

7. The method of claim 1, wherein generating the security tokens based on the sets of test results comprises comparing the sets of test results to sets of expected test results, and wherein the security tokens are generated based on differences between the sets of test results and the sets of expected test results.

8. The method of claim 7, wherein, for at least some of the sets of test results, comparing the set of test results to the set of expected test results comprises comparing the set of test results to one or more expected client characteristics, an expected profile of application services when accessed, and expected user activity.

9. The method of claim 1, wherein, for at least some of the user-agent applications, the set of security tests is executed by a security module of a user-agent application, and wherein the method further comprises:

receiving, responsive to sending the security token to the client device, an application action identified by the security module;

updating, at the security verification system, the security token based on the application action; and providing, by the security verification system, the updated security token to the user-agent application.

10. The method according to claim 9, wherein each of the security tokens further comprises information from which a recommended action for the security module is based on.

11. The method according to claim 9, wherein each of the security tokens further comprises additional information, and wherein the method further comprises determining access and information to be presented to a user based on the additional information.

12. The method according to claim 1, wherein a user's actions for accessing the services are not changed by whether or not the security tests are executed.

13. A non-transitory computer-readable storage medium comprising instructions that, when executed by a processor, cause the processor to perform steps comprising:

selecting and sending over a network, by a security verification system to a plurality of client devices executing user-agent applications accessing services from an application server, sets of security tests which, when executed by the user-agent applications, are indicative of whether behaviors of the user-agent applications are consistent with expected behaviors for the user-agent applications accessing services from the application server;

receiving, at the security verification system from the client devices, sets of test results from the execution of the sets of security tests by the user-agent applications;

generating and sending, by the security verification system to the client devices, security tokens based on the sets of test results, wherein the security tokens verify security of the user-agent applications, and security policies at the application server are enforced based on the security tokens, wherein each of the security tokens is cryptographically signed for validation by the application server, and wherein each of the security tokens comprises a security score indicating whether access to the services at the application server is granted or denied.

14. The non-transitory computer-readable storage medium of claim 13 further comprising instructions that cause the processor to perform further steps of:

receiving, at the security verification system from the client devices, requests to verify security of the user-agent applications, the requests specifying one or more characteristics of the user-agent applications executing on the client devices, wherein selecting the sets of security tests is based on the one or more characteristics of the user-agent applications.

15. The non-transitory computer-readable storage medium of claim 14, wherein the one or more characteristics of the user-agent applications comprise a type of a user-agent application and a version of the user-agent application, and wherein identifying the sets of security tests based on the one or more characteristics of the user-agent applications comprises identifying the sets of security tests from a plurality of different sets of security tests, the sets of security tests associated with different combinations of types of user-agent applications and versions of user-agent applications.

16. The non-transitory computer-readable storage medium of claim 13, wherein the user-agent applications comprise web browsers, and the sets of security tests include scripts for execution by the web browsers.

17. The non-transitory computer-readable storage medium of claim 13, wherein the sets of security tests executed by the user-agent applications comprise at least one of:
- a test identifying a user's interactions with a user-agent application,
- a test identifying a display by the user-agent application for the service accessed from the application server,
- a test identifying the user-agent applications' interaction with the application server, and
- a test identifying an executing environment of the user-agent application.

18. The non-transitory computer-readable storage medium of claim 13, further comprising instructions that, when executed by the processor, causes the processor to perform steps of:
- responsive to the security score being below a threshold:
  - providing an additional set of security tests to the client device for execution by the application; and
  - receiving, from the client device, an additional set of test results reflecting the execution of the additional set of security tests,
  - wherein generating the security token is further based on the additional set of test results.

19. The non-transitory computer-readable storage medium of claim 13, wherein the security tokens for the user-agent applications comprise identifications of the sets of security tests.

20. The non-transitory computer-readable storage medium of claim 13,
- wherein generating the security tokens based on the sets of test results comprises comparing the sets of test results to sets of expected test results, and
- wherein the security tokens are generated based on differences between the sets of test results and the sets of expected test results.

21. The non-transitory computer-readable storage medium of claim 13,
- wherein, for at least some of the sets of test results, comparing the set of test results to the set of expected test results comprises comparing the set of test results to one or more expected client characteristics, an expected profile of application services when accessed, and expected user activity.

22. The non-transitory computer-readable storage medium of claim 13,
- wherein for at least some of the user-agent applications, the set of security tests is executed by a security module of a user-agent application, and
- wherein the non-transitory computer-readable storage medium further comprises instructions that cause the processor to perform further steps of:
  - receiving, responsive to sending the security token to the client device, an application action identified by the security module;
  - updating, at the security verification system, the security token based on the application action; and
  - providing, by the security verification system, the updated security token to the user-agent application.

23. The non-transitory computer-readable storage medium of claim 22, wherein each of the security tokens further comprises information from which a recommended action for the security module is based on.

24. The non-transitory computer-readable storage medium of claim 13, wherein a user's actions for accessing the services are not changed by whether or not the security tests are executed.

25. The non-transitory computer-readable storage medium of claim 13,
- wherein each of the security tokens further comprises additional information, and
- wherein the non-transitory computer-readable storage medium further comprises instructions that cause the processor to perform determining access and information to be presented to a user based on the additional information.

26. A method, comprising:
- selecting and sending over a network, by a security verification system to a plurality of client devices executing user-agent applications accessing services from an application server, sets of security tests which, when executed by the user-agent applications, are indicative of whether the user-agent applicant's interaction with the application server is consistent with expected interactions for the user-agent applications accessing services from the application server without the security tests;
- receiving, at the security verification system from the client devices, sets of test results from the execution of the sets of security tests by the user-agent applications;
- generating and sending, by the security verification system to the client devices, security tokens based on the sets of test results,
- wherein the security tokens verify security of the user-agent applications, and security policies at the application server are enforced based on the security tokens,
- wherein each of the security tokens is cryptographically signed for validation by the application server, and
- wherein each of the security tokens comprises a security score indicating whether access to the services at the application server is granted or denied.

\* \* \* \* \*